(12) United States Patent
Aichriedler

(10) Patent No.: US 11,728,916 B2
(45) Date of Patent: Aug. 15, 2023

(54) ROBUST HIGH SPEED SENSOR INTERFACE FOR REMOTE SENSORS

(71) Applicant: Infineon Technologies AG, Neubiberg (DE)

(72) Inventor: Leo Aichriedler, Puch (AT)

(73) Assignee: Infineon Technologies AG, Neubiberg (DE)

( * ) Notice: Subject to any disclaimer, the term of this patent is extended or adjusted under 35 U.S.C. 154(b) by 88 days.

(21) Appl. No.: 17/301,903

(22) Filed: Apr. 19, 2021

(65) Prior Publication Data
US 2021/0242954 A1 Aug. 5, 2021

Related U.S. Application Data

(63) Continuation of application No. 16/717,273, filed on Dec. 17, 2019, now Pat. No. 11,018,788, which is a
(Continued)

(51) Int. Cl.
*H04J 3/06* (2006.01)
*H04Q 9/04* (2006.01)
(Continued)

(52) U.S. Cl.
CPC .......... *H04J 3/0638* (2013.01); *H04J 3/0658* (2013.01); *H04L 12/403* (2013.01); *H04Q 9/04* (2013.01);
(Continued)

(58) Field of Classification Search
CPC .................... G01D 21/00; G05B 19/04; G05B 2219/31094; G05B 2219/31121;
(Continued)

(56) References Cited

U.S. PATENT DOCUMENTS 4,430,731 A 2/1984 Gimple et al.
4,750,176 A 6/1988 Van Veldhuizen
(Continued)

FOREIGN PATENT DOCUMENTS

CN 103733030 A * 4/2014 ............. G01C 19/00
CN 105119793 A * 12/2015
(Continued)

OTHER PUBLICATIONS

Bosch., "CAN Specification," Robert Bosch GmbH, Version 2.0, 1991, 72 pages.
(Continued)

*Primary Examiner* — Eric Nowlin
(74) *Attorney, Agent, or Firm* — Harrity & Harrity, LLP

(57) ABSTRACT

Systems, methods, and apparatuses are discussed that enable robust, high-speed communication of sensor data. One example system includes a sensor bus, an electronic control unit (ECU), and one or more sensors. The ECU is coupleable to the sensor bus and configured to generate a synchronization signal, and is configured to output the synchronization signal to the sensor bus. The one or more sensors are also coupleable to the sensor bus, and at least one sensor of the one or more sensors is configured to sample sensor data in response to the synchronization signal and to output the sampled sensor data to the sensor bus.

16 Claims, 11 Drawing Sheets

Related U.S. Application Data continuation of application No. 16/132,907, filed on Sep. 17, 2018, now Pat. No. 10,721,007, which is a continuation of application No. 14/959,226, filed on Dec. 4, 2015, now Pat. No. 10,079,650.

(51) Int. Cl.
*H04L 12/403* (2006.01)
*G01D 21/00* (2006.01)
*H04L 7/04* (2006.01)
*H04L 12/40* (2006.01)

(52) U.S. Cl.
CPC ............ *G01D 21/00* (2013.01); *H04J 3/0652* (2013.01); *H04L 7/044* (2013.01); *H04L 2012/40273* (2013.01)

(58) Field of Classification Search
CPC ........... G05B 2219/31135; G05B 2219/31174; G05B 2219/31179; H04J 3/0638; H04J 3/0652; H04J 3/0658; H04L 7/044; H04L 12/40; H04L 12/40019; H04L 12/40026; H04L 12/40039; H04L 12/40195; H04L 12/403; H04L 2012/4026; H04L 2012/40215; H04L 2012/40267; H04L 2012/40273; H04Q 9/04
See application file for complete search history.

(56) References Cited

U.S. PATENT DOCUMENTS

| | | |
|---|---|---|
| 4,783,652 A | 11/1988 | Lumelsky |
| 5,237,322 A | 8/1993 | Heberle |
| 5,404,460 A | 4/1995 | Thomsen et al. |
| 5,495,240 A | 2/1996 | Heberle |
| 6,298,066 B1 | 10/2001 | Wettroth et al. |
| 6,463,483 B1 | 10/2002 | Imperiali |
| 6,684,152 B2 | 1/2004 | Baeuerle |
| 7,337,344 B2 | 2/2008 | Barman et al. |
| 7,446,694 B1 | 11/2008 | Ahmed et al. |
| 7,519,005 B2 | 4/2009 | Hejdeman et al. |
| 7,698,040 B2 | 4/2010 | Long |
| 7,721,128 B2 | 5/2010 | Johns et al. |
| 7,747,415 B1 | 6/2010 | Churchill et al. |
| 8,035,512 B2 * | 10/2011 | Lertora ............ G06K 19/0717 709/224 |
| 8,037,753 B2 | 10/2011 | Fehrenbach et al. |
| 8,135,893 B2 | 3/2012 | Brindle |
| 8,249,095 B2 | 8/2012 | Bidenbach et al. |
| 8,290,746 B2 | 10/2012 | Urmanov et al. |
| 8,359,504 B1 * | 1/2013 | Pogosky .......... G01R 31/31932 714/731 |
| 8,433,836 B2 | 4/2013 | Matsumoto et al. |
| 8,503,482 B2 | 8/2013 | Zhou et al. |
| 8,504,748 B2 | 8/2013 | Matsuo et al. |
| 8,504,864 B2 | 8/2013 | Menon et al. |
| 8,577,634 B2 | 11/2013 | Donovan et al. |
| 8,750,324 B2 | 6/2014 | Hansquine et al. |
| 8,842,747 B2 | 9/2014 | Willms |
| 8,948,280 B2 | 2/2015 | Hammerschmidt et al. |
| 8,990,464 B2 | 3/2015 | Kessler |
| 9,172,565 B2 | 10/2015 | Cadugan et al. |
| 9,292,409 B2 | 3/2016 | Hammerschmidt et al. |
| 9,417,944 B2 | 8/2016 | Kessler |
| 9,461,937 B2 | 10/2016 | Hartwich et al. |
| 9,494,450 B2 * | 11/2016 | Nagy ..................... G01S 7/40 |
| 9,513,692 B2 | 12/2016 | Saraswat et al. |
| 9,527,460 B2 | 12/2016 | Dal et al. |
| 9,534,923 B2 * | 1/2017 | Yamashita ........... H03K 21/023 |
| 9,569,386 B2 | 2/2017 | Du |
| RE46,358 E | 4/2017 | Grounds et al. |
| 9,634,715 B2 | 4/2017 | Scheinkerman et al. |
| 9,710,419 B2 | 7/2017 | Hug et al. |
| 9,734,121 B2 | 8/2017 | Pitigoi-Aron et al. |
| 9,767,055 B2 * | 9/2017 | Boeck ................. G06F 13/4295 |
| 9,875,152 B2 | 1/2018 | Kessler |
| 9,928,194 B2 | 3/2018 | Ross et al. |
| 10,079,650 B2 | 9/2018 | Aichriedler |
| 10,341,587 B2 | 7/2019 | Dupoiron et al. |
| 10,606,794 B1 | 3/2020 | Kollmitzer |
| 10,707,984 B2 | 7/2020 | Pitigoi-Aron |
| 10,721,007 B2 | 7/2020 | Aichriedler |
| 2003/0023795 A1 | 1/2003 | Packwood et al. |
| 2003/0196000 A1 | 10/2003 | Magnussen |
| 2003/0201882 A1 * | 10/2003 | Moore .............. H04L 12/40032 340/3.5 |
| 2004/0039504 A1 | 2/2004 | Coffee et al. |
| 2004/0059396 A1 | 3/2004 | Reinke et al. |
| 2004/0183550 A1 | 9/2004 | Fehrenbach et al. |
| 2005/0197753 A1 | 9/2005 | Miura et al. |
| 2006/0039408 A1 | 2/2006 | Wortel et al. |
| 2007/0110106 A1 | 5/2007 | Becker et al. |
| 2007/0124105 A1 | 5/2007 | Johns et al. |
| 2007/0233923 A1 | 10/2007 | Lee |
| 2007/0248018 A1 | 10/2007 | Ranallo et al. |
| 2008/0077336 A1 | 3/2008 | Fernandes |
| 2009/0001892 A1 | 1/2009 | Van |
| 2009/0190571 A1 | 7/2009 | Kitz et al. |
| 2010/0060449 A1 * | 3/2010 | Lertora .............. G06K 19/0717 340/539.26 |
| 2010/0212568 A1 | 8/2010 | Zanfei |
| 2011/0211468 A1 | 9/2011 | Zhang et al. |
| 2012/0210154 A1 | 8/2012 | Hartwich |
| 2012/0221753 A1 | 8/2012 | Hartwich |
| 2012/0310509 A1 | 12/2012 | Pardo et al. |
| 2013/0057339 A1 | 3/2013 | Koudar |
| 2013/0130751 A1 | 5/2013 | Vummintala et al. |
| 2013/0335043 A1 | 12/2013 | He et al. |
| 2014/0301550 A1 | 10/2014 | Lewis et al. |
| 2014/0331736 A1 * | 11/2014 | Nagy ...................... G01S 7/40 73/1.01 |
| 2014/0350894 A1 * | 11/2014 | Yamashita ............. G01C 23/00 702/189 |
| 2015/0236746 A1 * | 8/2015 | Scheinkerman ......... H04B 1/40 375/219 |
| 2016/0190863 A1 | 6/2016 | Ogasawara et al. |
| 2017/0041897 A1 | 2/2017 | Pitigoi-Aron et al. |
| 2017/0096958 A1 | 4/2017 | Jiang et al. |
| 2017/0104733 A1 | 4/2017 | Thanigasalam |
| 2017/0334449 A1 | 11/2017 | Feifel et al. |
| 2017/0364472 A1 | 12/2017 | Pitigoi-Aron et al. |
| 2018/0050604 A1 | 2/2018 | Hare et al. |
| 2018/0065481 A1 | 3/2018 | Morisset et al. |
| 2018/0090008 A1 | 3/2018 | Ikenouchi et al. |
| 2018/0129204 A1 | 5/2018 | Ricci et al. |
| 2018/0129291 A1 | 5/2018 | Weddle et al. |
| 2018/0152316 A1 * | 5/2018 | Schoenfeld ......... H04L 12/4013 |
| 2020/0076713 A1 | 3/2020 | Meyer et al. |
| 2020/0104270 A1 | 4/2020 | Poezart et al. |
| 2020/0127750 A1 | 4/2020 | Aichriedler |

FOREIGN PATENT DOCUMENTS

| | | | | |
|---|---|---|---|---|
| CN | 103733030 B | * | 1/2016 | ............ G01C 19/00 |
| CN | 205192427 U | | 4/2016 | |
| CN | 108116344 A | * | 6/2018 | ......... B60R 21/0136 |
| CN | 105119793 B | | 3/2019 | |
| CN | 105119793 B | * | 3/2019 | |
| DE | 19606673 C1 | | 4/1997 | |
| DE | 19945614 C1 | | 12/2000 | |
| DE | 102017122479 A1 | | 3/2018 | |
| DE | 102016223673 A1 | * | 5/2018 | ......... B60R 21/0136 |
| EP | 2818836 A1 | * | 12/2014 | ............ G01C 19/00 |
| EP | 2818836 B1 | * | 4/2016 | ............ G01C 19/00 |
| EP | 2893293 B1 | * | 11/2016 | ........... G01B 21/047 |
| EP | 3386191 A1 | | 10/2018 | |
| FR | 3065133 A1 | | 10/2018 | |
| JP | 4772992 B2 | | 9/2011 | |
| JP | 6332383 B2 | | 5/2018 | |
| KR | 100839494 B1 | | 6/2008 | |

(56) References Cited

FOREIGN PATENT DOCUMENTS

WO     WO-2013124903 A1 *   8/2013  ............. G01C 19/00
WO         2017062084 A1     4/2017

OTHER PUBLICATIONS

Corrigan S., "Introduction to the Controller Area Network (CAN)," Texas Instruments, Aug. 2002, , SLOA 101B, 17 pages.
Final Office Action for U.S. Appl. No. 14/959,226 dated Dec. 6, 2017, 46 pages.
Non-Final Office Action for U.S. Appl. No. 14/959,226 dated Jun. 5, 2017, 28 pages.
Notice of Allowance for U.S. Appl. No. 14/959,226 dated May 29, 2018, 16 pages.
NXP Semiconductors, "UM10204 I2C-bus specification and user manual," https://www.nxp.com/docs/en/user-guide/UM10204.pdf, Apr. 4, 2014, 64 pages.

* cited by examiner

ROBUST HIGH SPEED SENSOR INTERFACE FOR REMOTE SENSORS

CROSS-REFERENCE TO RELATED APPLICATIONS

This application is a continuation of U.S. patent application Ser. No. 16/717,273, filed Dec. 17, 2019, which is a continuation of U.S. patent application Ser. No. 16/132,907, filed on Sep. 17, 2018 (now U.S. Pat. No. 10,721,007), which is a continuation of U.S. patent application Ser. No. 14/959,226, filed on Dec. 4, 2015 (now U.S. Pat. No. 10,079,650), the contents of which are incorporated herein by reference in their entireties.

FIELD

The present disclosure relates to a sensor interface for remote sensors that can provide improved speed and robustness, with reduced wiring requirements.

BACKGROUND

Sensors such as speed or position sensors are used to provide feedback information in mechatronic systems, and are thus used as an interface between the mechanical and the electrical domain. In many cases, the positioning of a sensor is driven by mechanical constraints, for example, the available constructed space or accessibility of sensing targets (target wheel, shaft end, etc.). Therefore, in most applications the sensor cannot be embedded into the ECU (electronic control unit) but has to operate as a standalone sensor (satellite sensor) that has to be connected to the control unit through a (wired) interface.

The interface is the most critical component in a sensing solution in terms of robustness, cost, and performance. Regarding robustness, the cable and connector provide the most significant contribution to the overall FIT (failures in time) rate. Additionally, the cost of the cable and connectors in combination with the cost of assembly and maintenance contribute significantly to the total cost of ownership (TCO). In terms of performance, the sensor interface in many conventional systems provides the "bottleneck" for the information transfer. While the sensing information (e.g., sensing and diagnostic data) is available at a much higher resolution (in time and/or accuracy) at the sensor location, it cannot be transferred and used at that resolution in the ECU because of missing connection bandwidth. Additionally, many conventional interfaces only provide a one-way data link (e.g., sensor to ECU, but not vice versa), thus a dynamic adjustment of sensor parameters or even synchronization between sensor and ECU is not possible, resulting in performance degradation of the entire system. Finally, most conventional connection schemes are point-to-point connections between sensor and ECU. In these situations, complex systems comprising several remote sensors result in complex wiring harnesses.

Conventional sensor systems mainly use pin-to-pin interfaces for sensors. Typical implementations are single-ended voltage interfaces (with 3 wires per sensor, such as SENT (single edge nibble transmission), SPC (short PWM (pulse width modulation) code, etc.) or current interfaces (with 2 wires per sensor, such as those used in ABS (anti-lock braking system) or transmission speed sensors). Conventional interface varieties include digital voltage interfaces, analog voltage interfaces, basic current interfaces, and complex current interfaces.

In digital voltage interfaces, SENT is a universal interface used to transfer a digital data stream to the ECU (e.g., unidirectionally) without synchronization and bus capability. SPC is an Infineon-owned proprietary extension of SENT, enabling synchronization and basic bus capability. The implementation of the physical layer interface is very basic, thus the available bandwidth (and therefore the resulting baudrate) of the interface is very limited (20 kBaud). Due to the basic implementation, the interface exhibits a high vulnerability when exposed to EMI or ESD. The key benefit of SENT/SPC is the low complexity of the physical layer and the possibility to transfer digital data comprising both sensing and diagnostic data. However, due to the low update rate, it is insufficient for many applications (e.g. rotor position sensing).

Analog voltage interfaces provide high bandwidth and maximum flexibility in terms of system integration. When used as an external sensor interface, analog links suffer from high vulnerability (e.g., to voltage exposure, EMI, ESD), a high number of signal wires (especially for differential signal runs) as well as a lack of capability to transfer additional (e.g., diagnostic) data.

The key benefit of current interfaces is the fact that the information transfer can be performed via the sensor supply lines, typically resulting in a two-wire interface.

For basic current interfaces, the low cost implementations of the physical layer exhibit a similar level of vulnerability in terms of EMI and ESD as seen on the voltage interfaces described above. In conventional implementations, several protocols are used ranging from a simple pulse train reflecting particular position indices (e.g., transmission speed sensors) up to advanced, proprietary protocols that included a limited set of diagnostic data in the data stream (e.g., the VDA protocol used for wheel speed sensors).

PSI5 (Peripheral Sensor Interface 5) and DSI (Distributed System Interface) are examples of complex current interfaces that utilize dedicated interface drivers, providing both the physical layer interface as well as a low-level data link layer. PSI5 also features a synchronization and low speed downstream communication capability. Despite the high effort in such interfaces, the available data rate is relatively low (e.g., 192 kBaud gross data rate for PSI5). Another drawback of complex current interfaces is the lack of readily available stand-alone general purpose transceivers, thus the cost of these implementations is too high to find broad market acceptance as a general purpose sensor interface.

DETAILED DESCRIPTION

Figure 1:
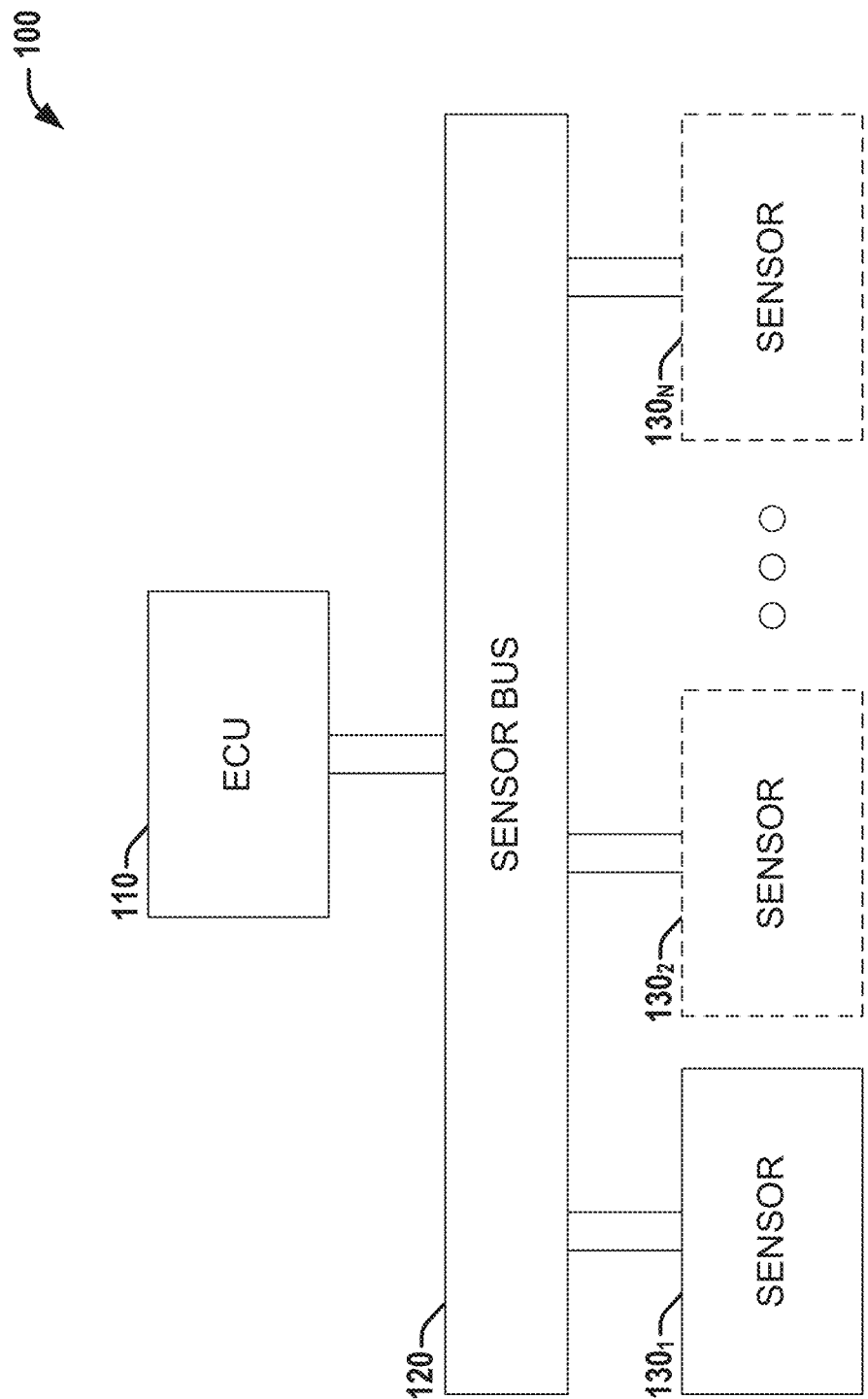
FIG. 1 is a block diagram illustrating a system that facilitates high speed and robust communication with remote sensors according to various aspects described herein.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a mobile phone with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising".

Embodiments disclosed herein relate to sensor interfaces with multiple advantageous features. In various aspects, systems and methods described herein can employ a differential bus interface, including, for example, a widely accepted differential bus interface such as CAN-HS for sensor-to-ECU communication. Line coding can be based on a non-return-to-zero (NRZ) technique, which, as used herein, can include variations such as NRZ inverted (NRZI), etc. In various aspects, USART can be employed for data encoding, and bus resynchronization can be accomplished via dedicated synchronization and resynchronization bits within a data frame. These synchronization and resynchronization bits can simplify microcontroller requirements (as bit-stuffing is not required), and can enable constant message frame length (and thus, pre-defined latency and transfer times). Various embodiments described herein can include an addressing feature to allow for multiple sensors to be connected onto the same bus. Additionally, in aspects, a synchronization frame can be employed to enable synchronous sampling of multiple sensors.

Embodiments described herein can provide or employ a sensor interface with multiple advantages over conventional sensor interfaces. In various aspects, interfaces described herein can provide: a high update rate (e.g., in some example embodiments, update times of $T_{update}$=50 μs, scalable down to $T_{update}$=30 μs, etc.); synchronization features (e.g., from ECU to sensor); bus addressing features (e.g., up to 4 participants/bus, or more in various embodiments); defined latency and transfer times; safe transfer of sensing and sensor diagnostic data; ability to handle high voltage exposure (e.g., automotive battery voltage levels, etc.); high levels of EMI (electromagnetic interference) and ESD (electrostatic discharge) robustness; implementations involving readily available components; and compatibility with a broad range of microcontrollers.

Referring to FIG. 1, illustrated is a block diagram of a system 100 that facilitates high speed and robust communication with remote sensors according to various aspects disclosed herein. System 100 can include an ECU 110, a sensor bus 120, and one or more sensors 130$_1$-130$_N$. Although the specific example embodiments discussed herein relate to vehicular sensor systems (e.g., in connection with motors, transmissions, etc.) system 100 can be implemented in a variety of settings to sample sensor data of substantially any characteristic (e.g., physical characteristics such as positions/angles, temperatures, magnetic fields, currents, rates of change thereof; chemical characteristics such as the presence, absence, or concentration of a substance; etc.) and communicate that sensor data via the high speed interface discussed herein.

The ECU 110 can be coupled to the sensor bus 120 (e.g., via a differential transceiver), and can communicate with the sensors 130$_i$ via the sensor bus 120. ECU 110 can generate and output a synchronization signal. The synchronization signal or pulse can both trigger sampling by at least one of the sensors 130$_i$ and be employed synchronize the one or more sensors 130$_i$ to a common clock (e.g., the clock of the ECU, etc.). In some embodiments (e.g., embodiments with more than one sensor 130$_i$), the synchronization signal can comprise an address element (e.g., one or more bits) that can indicate the sensor or sensors 130$_i$ to sample sensor data. For example, the synchronization signal can include at least one synchronization bit (e.g., a dominant bit for synchronization), which can be (in some embodiments, e.g., those with multiple sensors 130$_i$, etc.) followed by the address element, which can comprise one or more address bits, where the number of address bits determines the maximum number of sensors and/or sensor combinations that can be uniquely identified in the system (e.g., for 1 bit, two sensors or sensor combinations can be uniquely identified, for 2 bits, four, eight bits, etc.). In various embodiments, the length of the synchronization pulse can be the same length as data frames transmitted by the one or more sensors 130$_1$ (which can have constant length data frames in such embodiments), and the address information can be contained in the duty cycle of the frame, which can determine the number of address bits based on the common length of the data frames and synchronization pulse.

The sensor bus 120 can be a differential bus (and ECU 110 and sensors 130$_i$ can have differential transceivers for transmitting and receiving via sensor bus 120), and communication via sensor bus 120 (e.g., of synchronization signals, sensor data, etc.) can employ any of a variety of line codings, such as a NRZ (non-return-to-zero) coding, which, as used herein, can include variants on NRZ such as NRZI (NRZ inverted), etc.

The one or more sensors 130$_i$ can also be coupled to the sensor bus 120 (e.g., with each coupled via an associated differential transceiver, which can be included within a module of that sensor 130$_i$ or a discrete component). The one or more sensors 130$_i$ can receive the synchronization signal and can sample sensor data (e.g., via a sensor element) in response to the synchronization signal. Additionally, the one or more sensors 130$_i$ can output the sampled sensor data to the sensor bus 120, where it can be received by the ECU 110.

In some embodiments (e.g., embodiments with more than one sensor 130$_i$), each sensor 130$_i$ can be associated with one or more addresses (e.g., an address unique to the sensor and/or one or more other addresses shared with at least one other sensor). In such embodiments, the synchronization signal can comprise an address element that indicates a selected address, and upon receiving the synchronization signal, each sensor 130$_i$ associated with the selected address can sample associated sensor data. In various aspects where at least two sensors 130$_i$ is associated with the selected address, this sampling can occur simultaneously for each of the at least two sensors 130$_i$ associated with the selected address. In some aspects, the synchronization signal from ECU 110 can be a broadcast synchronization signal (e.g., via including a specific address element designated for the broadcast synchronization signal), wherein each of the sensors 130$_i$ samples sensor data in response to the broadcast synchronization signal.

Any sensor 130$_i$ that sampled sensor data in response to the synchronization signal can then output the sampled sensor data to the sensor bus 120. In various aspects, the outputting of the sensor data can be in response to the synchronization signal, for example, with the sensor data output based on the timing of the synchronization signal. Additionally, any sensor 130$_i$ that is outputting sensor data to the sensor bus 120 can output one or more resynchronization bits (e.g., at the start of or otherwise within some or all data frames, etc.) that can be used to facilitate clock synchronization. In some embodiments, all data frames can have a constant length, while in other embodiments, some data frames (e.g., those from a first set of one or more sensors, etc.) can have a different length than some other data frames (e.g., those from a second set of one or more sensors, etc.).

For embodiments wherein more than one sensor 130$_i$ samples sensor data based on a single synchronization signal (e.g., comprising an address element associated with each of the more than one sensors 130$_i$), those more than one sensors 130$_i$ can output their respective sensor data at different points in time (e.g, sequentially, with or without one outputting immediately after the other, etc.). The order of outputting sensor data can be predetermined, for example, based on addresses uniquely associated with the sensors 130$_i$ (e.g., in order of increasing or decreasing address, etc.).

Figure 2:
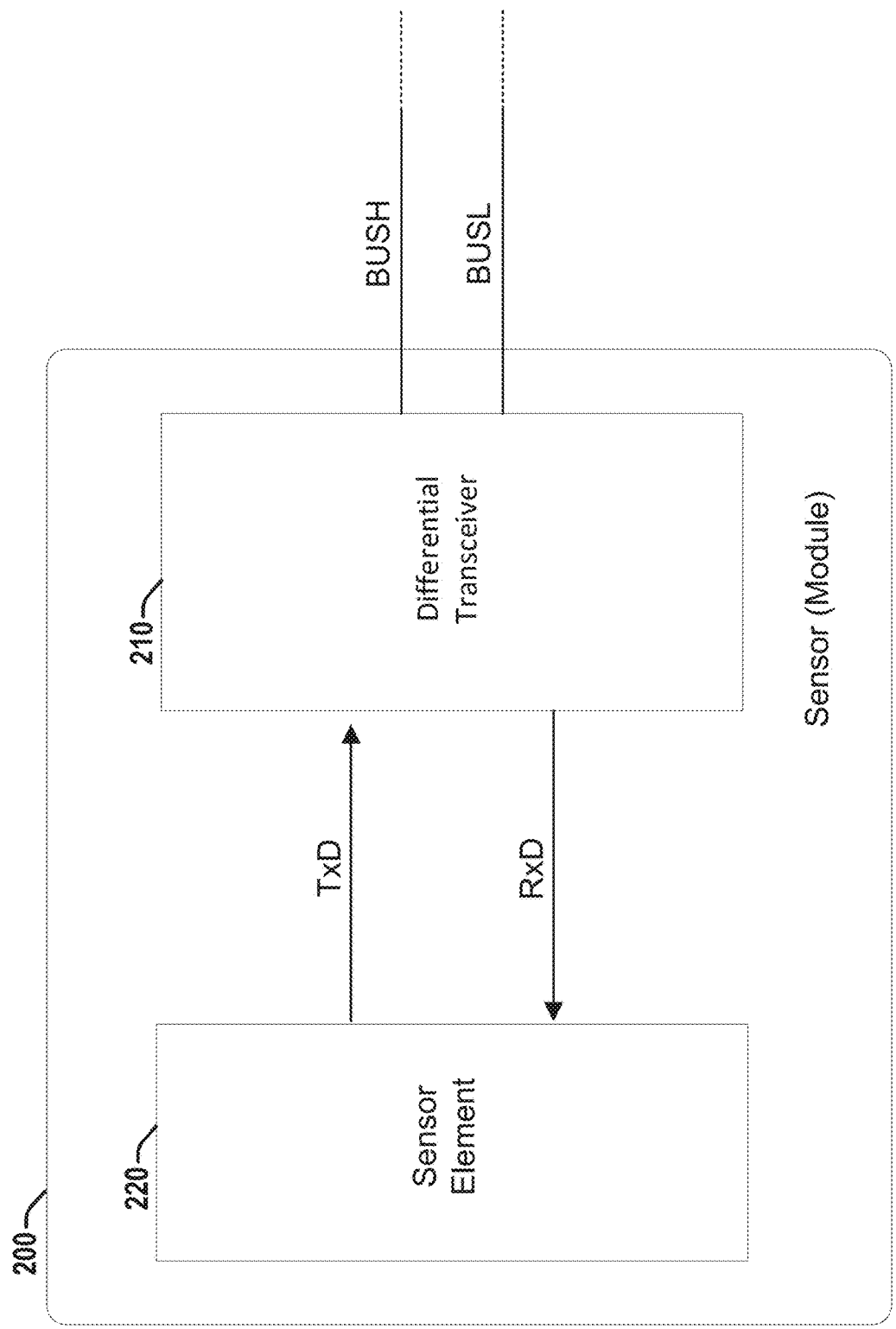
FIG. 2 is a block diagram illustrating a sensor configured to communicate via a differential sensor interface according to various aspects described herein.

Referring to FIG. 2, illustrated is a block diagram of a sensor 200 configured to communicate via a differential sensor interface according to various aspects disclosed herein. Sensor 200 can include a differential transceiver 210 and a sensor element 220. In various aspects, sensor 200 can be employed as a sensor in connection with systems, methods, and apparatuses discussed herein, such as in system 100.

Differential transceiver 210 can be coupled to a sensor bus, such as the differential sensor buses discussed herein (e.g., sensor bus 120). Differential transceiver 210 can transmit and receive data via a differential line coding, such as an NRZ coding. For example, differential transceiver 210 can receive synchronization signals (e.g., such as those from an ECU such as ECU 110, etc.), and can transmit sampled sensor data (e.g., which can be transmitted along with one or more resynchronization bits, etc.). In some aspects, sampled sensor data can be transmitted in response to the synchronization signal (e.g., based at least in part on the timing of the synchronization signal, etc.).

In response to a synchronization signal being received by differential transceiver 210, sensor element 220 can sample sensor data (e.g., values associated with one or more sensed characteristics).

Additionally, in some embodiments (e.g., systems, methods, and apparatuses employing more than one sensor, etc.), sensor 200 can be associated with one or more addresses, and sensor element 220 can sample sensor data when the synchronization signal received by differential transceiver 210 indicates one of the associated addresses via an address element. In some aspects, at least one of those addresses can be associated with only sensor 200, although in other aspects, sensor 200 is only associated with one or more addresses that are also associated with at least one other sensor. For example, if sensor 200 has a unique address, a synchronization signal can indicate that address, and only sensor 200 can sample sensor data in response to that indicated address. In another example, if sensor 200 is associated with one or more addresses that are also associated with additional sensors, in response to a synchronization signal indicated one of those addresses, both sensor 200 and the one or more additional sensors can sample sensor data simultaneously.

Figure 3:
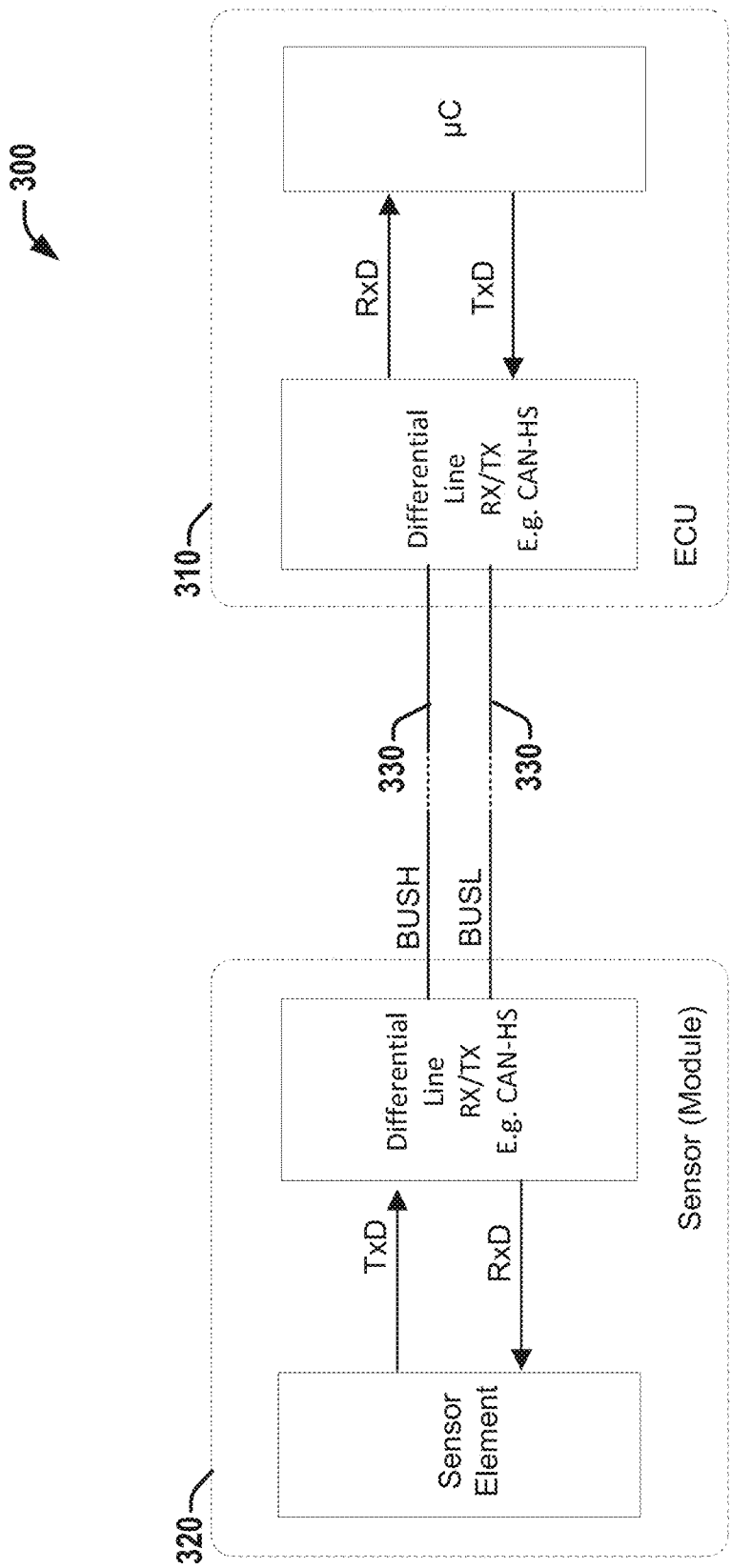
FIG. 3 is a block diagram illustrating a sensor-to-ECU connection employing a differential sensor interface to facilitate communications between the sensor and ECU according to various aspects described herein.

Referring to FIG. 3, illustrated is a block diagram of a sensor-to-ECU connection employing a differential sensor interface 330 to facilitate communications between the sensor 320 and ECU 310, according to various aspects described herein. In aspects, embodiments described herein can employ a digital differential signal transceiver as a physical layer for sensor data transmission. In various embodiments, a variation of the CAN-HS (controller area network-high speed) standard can be used as the physical layer. CAN-HS is not only a well-established standard in terms of physical layer implementation, but also determines the datalink layer(s) as described in ISO (International Organization for Standardization) standard 11898 (ISO 11898). However, due to the significant data overhead of the ISO11898 required to support general purpose multi-master networks with high number of participants (CAN-HS uses identifiers with lengths of either 11 bits or 29 bits), the available net data rate on the bus would be way too low if the existing CAN-HS standard were employed as defined. Therefore, in aspects described herein, an application specific data link layer (e.g., stack) can be employed that is optimized for interfacing to remote sensors with significantly reduced overhead.

Bit coding in CAN-HS is based on a NRZ (non-return-to-zero) coding scheme. For proper re-synchronization between transmitter and receiver, ISO11898 specifies a bit stuffing method which ensures a bus state transition after a maximum of 5 consequent bits of same value. Since bit stuffing requires computing power on both the transceiver as well as the receiver it is usually implemented in the CAN interface block of specific microcontrollers. To enable the use of standard microcontrollers that do not feature any CAN interface functionality the signal on the bus can be encoded in a regular USART (universal synchronous/asynchronous receiver/transmitter) format (e.g., RS-232, etc.). In contrast to the CAN standard, the re-synchronization in embodiments described herein can be performed via frame synchronization and re-synchronization bits. For example, in embodiments with more than one sensor, this can be accomplished via an address header followed by a frame synchronization bit and dedicated resynchronization bits within the data frame. Besides the advantage of reduced hardware/software complexity, including dedicated synchronization (and resynchronization) bits (e.g., as opposed to employing bit stuffing) can ensure predictable frame lengths, which provides the advantage for sensing applications of enabling predictable interface latency times. In various embodiments, each sensor can employ a constant frame length. Alternatively, in other embodiments, some or all of the sensors can employ different frame lengths from other sensors.

Figure 4:
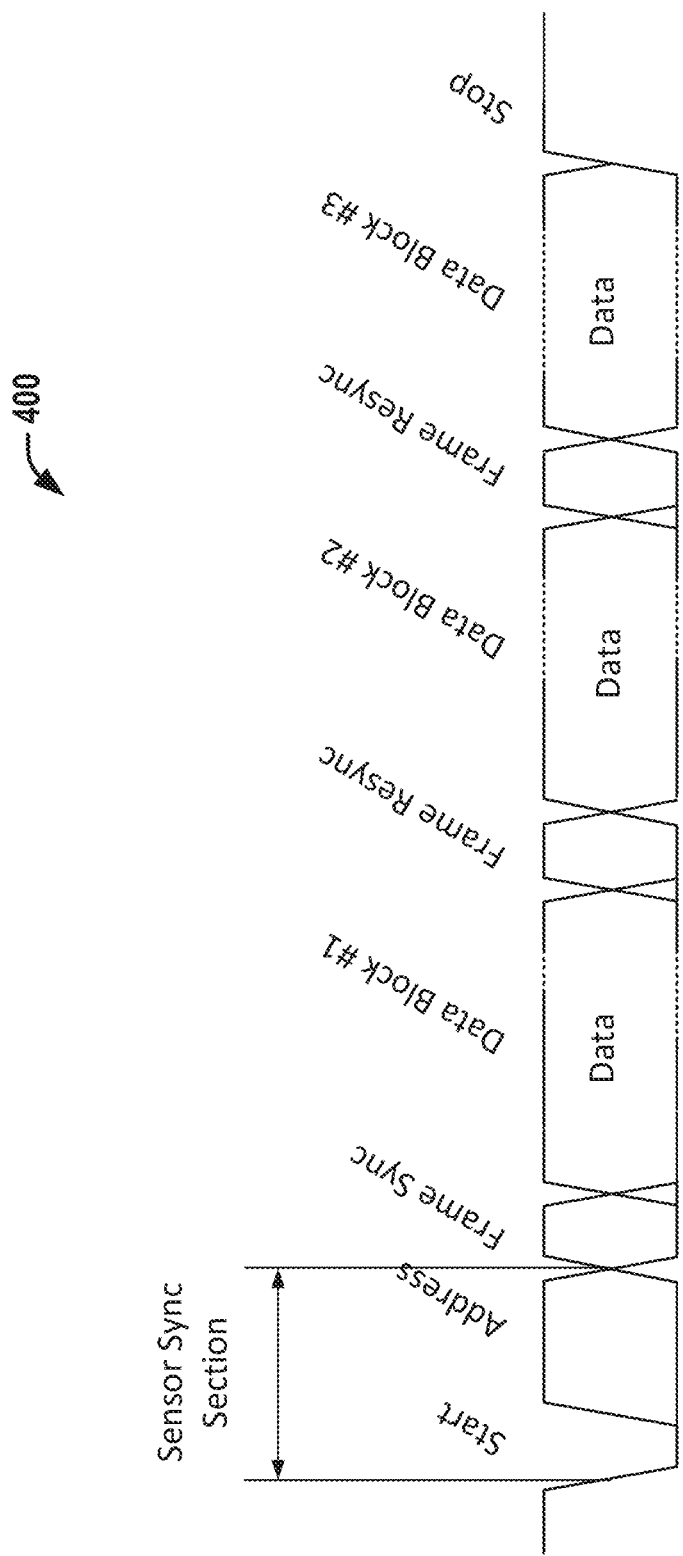
FIG. 4 is a diagram illustrating an example transmission protocol for communication via a sensor interface according to various aspects described herein.

Referring to FIG. 4, illustrated is an example of a transmission protocol 400 for communication via a sensor interface according to various aspects described herein. Although FIG. 4 shows a specific example transmission protocol 400 employed in connection with specific embodiments to illustrate aspects described herein, in other embodiments, transmission protocols with other characteristics may be employed. For example, the number of address bits employed in transmission protocol 400 can be selected to be any number of address bits (e.g., 2, 3, 4, 8, etc.) or can be determined by setting the length of the synchronization pulse the same as the length of a data frame, or for embodiments with only one sensor connected via the bus, the address bits can be omitted, as each synchronization pulse driven by the ECU will indicate that sensor should sample sensor data. Additionally, the number of data bits per data block can vary (e.g., other than the eight bits shown in transmission protocol 400), as can how often a synchronization or resynchronization bit is transmitted (e.g., other than the every nine bits shown in transmission protocol 400), as well as other characteristics of transmission protocol 400.

Figure 5:
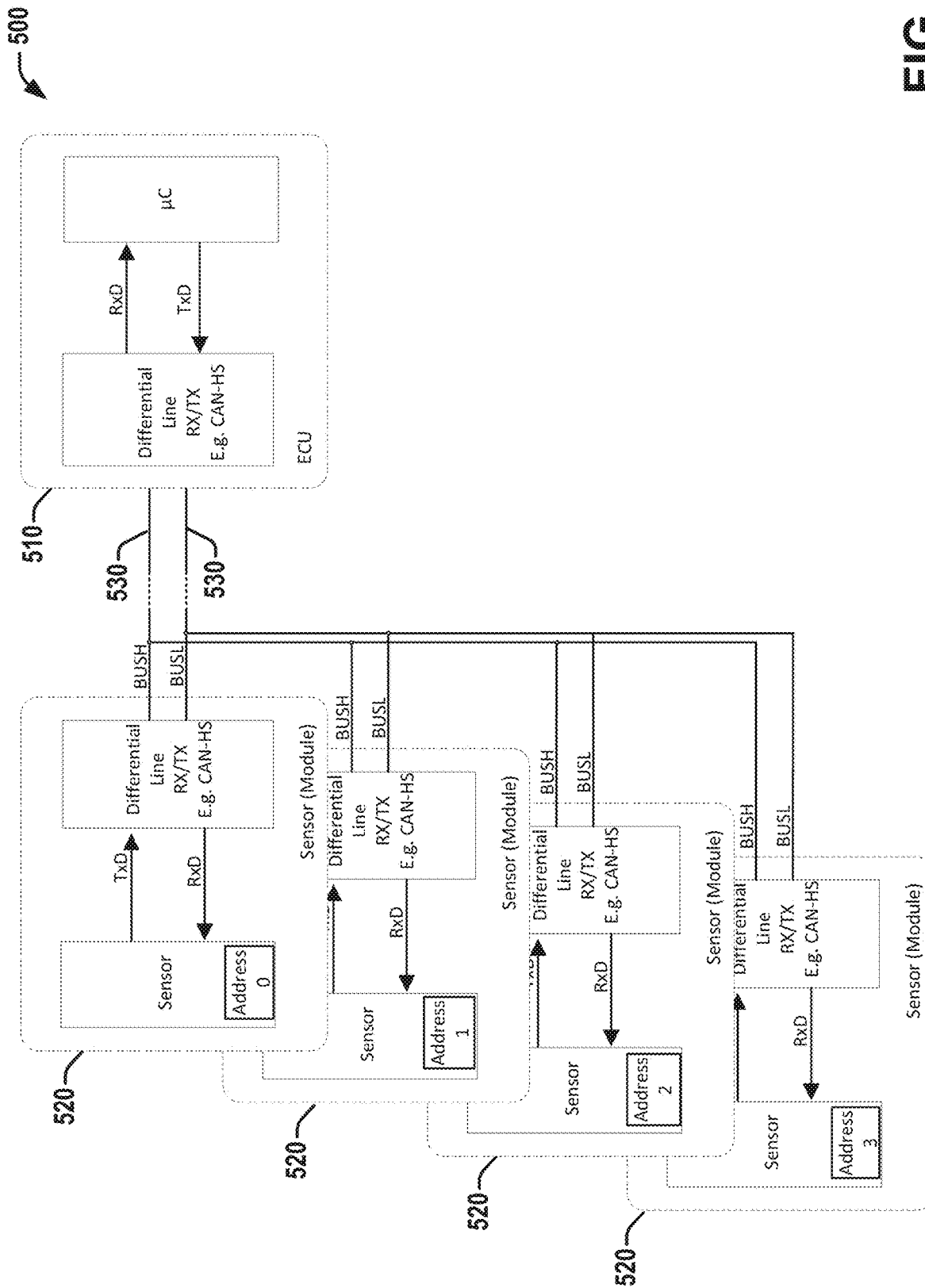
FIG. 5 is a block diagram illustrating an example arrangement of a sensor cluster employing a differential sensor interface to facilitate communications between four sensors and an ECU according to various aspects described herein.

For most applications involving remote sensors, it can be advantageous to synchronize the sensor to the ECU clock domain. To do so, the ECU can generate and transmit a synchronization signal to the sensor. In various embodiments described herein, this synchronization can be achieved by a synchronization pulse (e.g., wherein the bus is driven by the ECU) to initiate the data sampling and data transfer of the sensor. At the same time, the length of the synchronization pulse can be used as an addressing feature. In one example transmission protocol, the synchronization section consists of 3 bits. The first bit can be set continuously dominant (for synchronization) while the consequent two bits can be used to indicate a specific sensor address of a plurality of sensor addresses. Thus, the example transmission protocol 400 can support up to four sensors on one ECU output (alternatively, for a 4 bit synchronization section, up to 8 sensor addresses could be supported on one ECU output, etc.). Referring to FIG. 5, illustrated is an example arrangement of a sensor cluster employing a differential sensor interface 530 to facilitate communications between four sensors 520 and an ECU 510, according to various aspects described herein.

Figure 6:
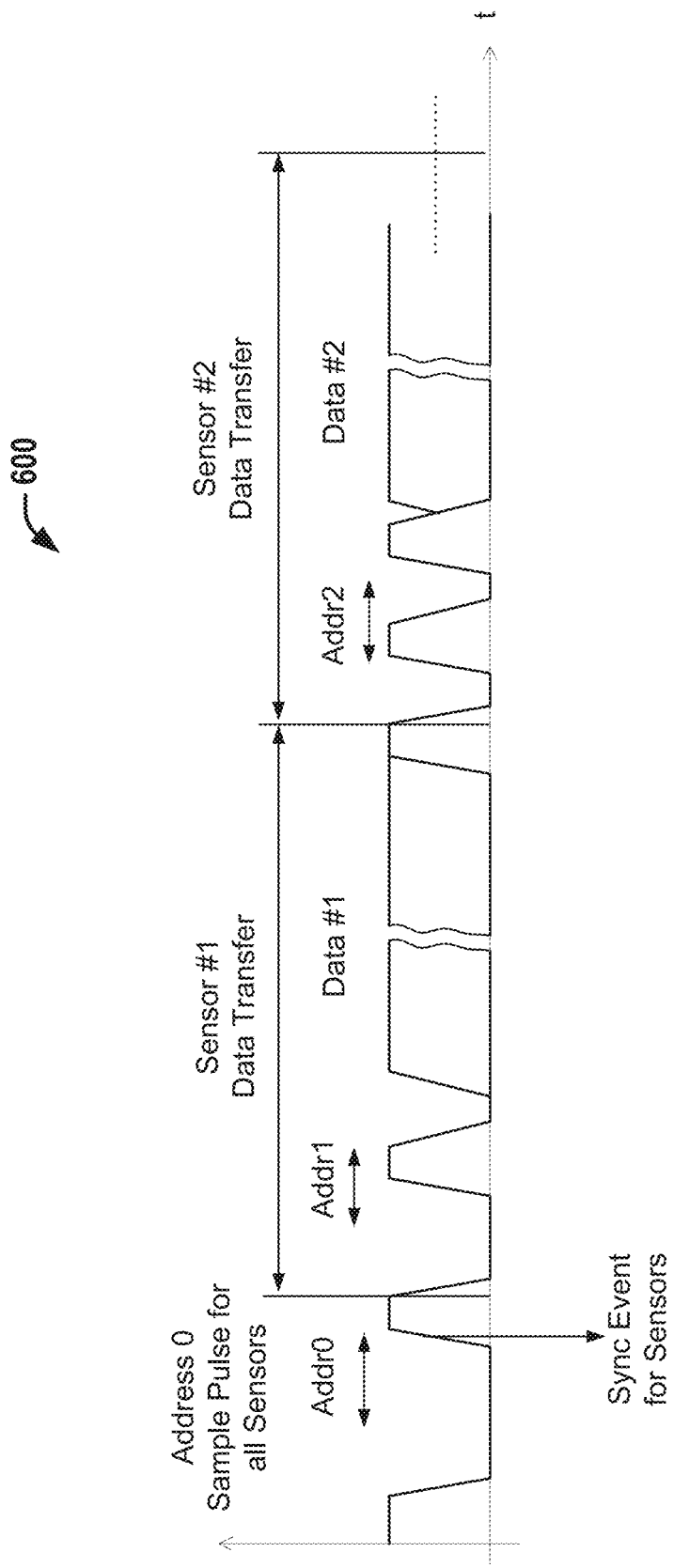
FIG. 6 is a diagram illustrating an example transmission protocol for a broadcast synchronization pulse, wherein a plurality of sensors simultaneously sample data, according to various aspects described herein.

In some aspects, a plurality of sensors connected to the sensor bus can be configured to sample data at the same time (e.g., a current sensor and a rotor position sensor within a motor control application), with the plurality of sensors associated with a distinct address of the plurality of addresses. After simultaneously sampling respective sensor data, the data can then be transmitted sequentially. Referring to FIG. 6, illustrated is an example transmission protocol 600 for a broadcast synchronization pulse, wherein a plurality of sensors simultaneously sample data, according to aspects described herein. As can be seen in FIG. 6, the transmission of the initial synchronization pulse by the ECU includes an address that is associated with a plurality of sensors for simultaneous data sampling. After the synchronization pulse, each of the plurality of sensors samples data simultaneously, and then each sensor of the plurality of sensors sequentially transmits the data sampled by that sensor (e.g., according to a predetermined order, such as in order of ascending (or descending) addresses of the addresses uniquely associated with those sensors, etc.). In embodiments wherein at least one of the plurality of addresses is used for simultaneous sampling by a plurality of sensors, the maximum number of sensors is reduced for a given number of address bits (for example, for two address bits, there are four addresses, which can be assigned to four distinct sensors, to three distinct sensors and one plurality of sensors for simultaneous sampling, etc.).

Figure 7:
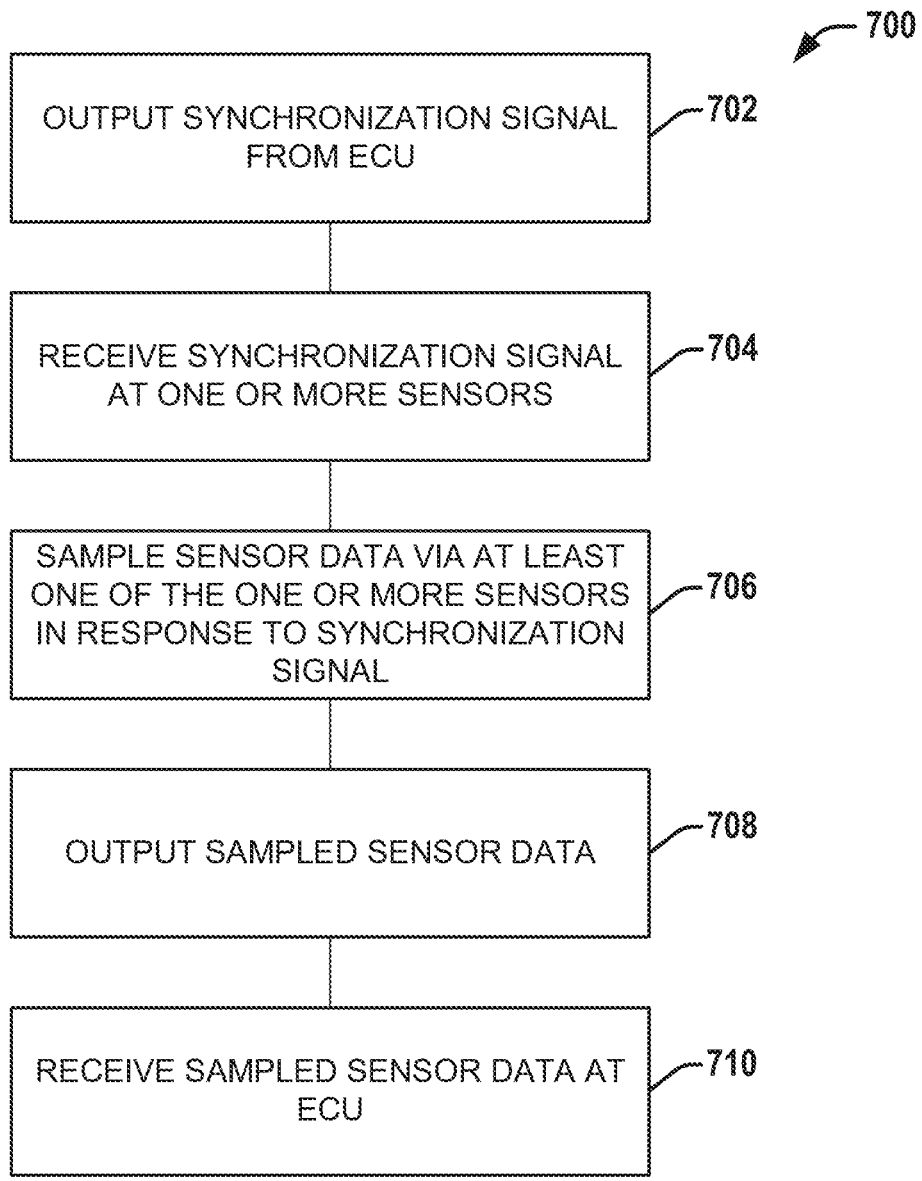
FIG. 7 is a flow diagram illustrating a method that can facilitate communication via a sensor interface according to various aspects described herein.

Referring to FIG. 7, illustrated is a flow diagram of a method 700 that can facilitate communication via a sensor interface according to various aspects discussed herein. At 702, a synchronization signal can be output from an ECU (e.g., to a differential sensor bus as described herein, etc.), such as synchronization signals discussed herein (e.g., that can, but need not, include an address element, etc.). At 704, the synchronization signal can be received by one or more sensors (e.g., via the differential sensor bus). In response to the synchronization signal, at 706, sensor data can be sampled by at least one of the one or more sensors (e.g., if there is only one sensor, by that sensor; by one or more sensors indicated via an address element of the synchronization signal; by all sensors in response to a broadcast synchronization signal; etc.). At 708, the at least one sensor can output the sampled sensor data. At 710, the sampled sensor data can be received at the ECU.

Embodiments described herein can be employed in multiple applications. Although the following examples are provided in connection with vehicular (e.g., automotive, etc.) sensor systems, embodiments described herein can be employed in a diverse range of applications to provide communication of sensor data via a high speed, robust interface.

Figure 8:
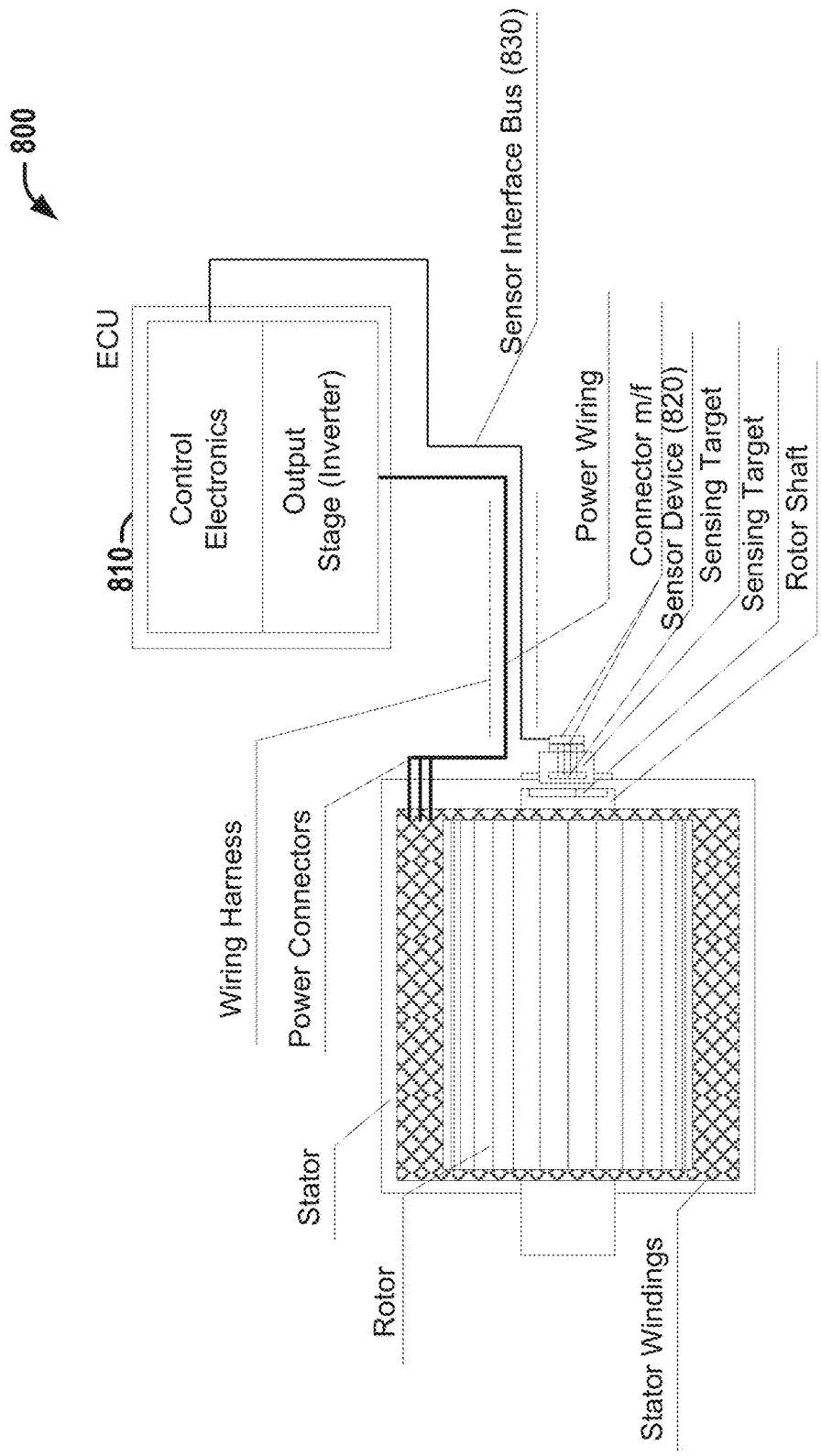
FIG. 8 is a diagram illustrating an example drive implementation of a sensor system according to various aspects described herein.

In a first example application, a system as described herein can be employed in a motor control application. Referring to FIG. 8, illustrated is an example drive implementation of a sensor system 800 according to various aspects described herein. In many situations (e.g., high power drives, etc.) the control electronics 810 are separated from the motor, thus the rotor position sensor 820 (e.g., at end-of-shaft or out-of-shaft) cannot be embedded into the control ECU. Employing a high speed interface 830 as described herein to connect the sensor 820 to the ECU 810 provides multiple advantages over conventional systems, providing advantages in terms of the availability of sensor data, reduction of connection wires, reduced size and cost of the sensor connector (which can determine the size of the sensor module it multiple wires are required), and the robustness of the interface (e.g., with respect to EMI and ESD arising from vicinity to high power wiring or cross-coupling).

Figure 9:
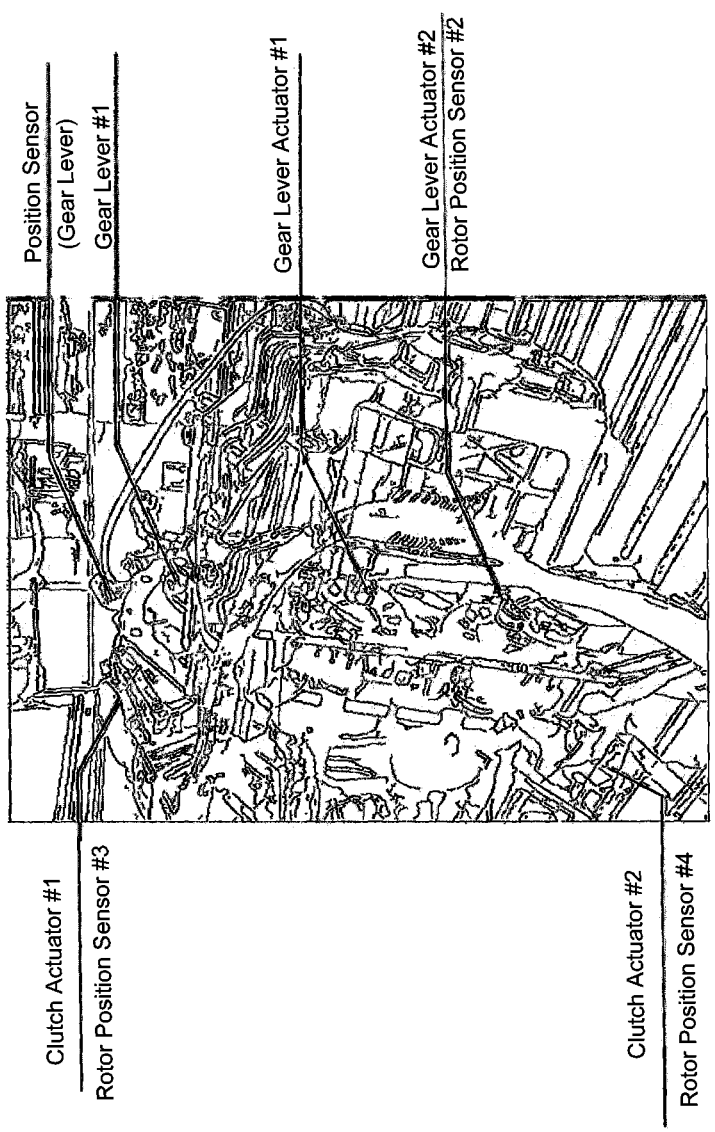
FIG. 9 is a diagram illustrating a dry double clutch transmission system, showing multiple sensors that can be controlled by an ECU via an interface according to various aspects described herein.

In a second set of example applications, embodiments described herein can provide significant advantages over conventional systems in situations wherein more than one motor is be controlled by one ECU. Referring to FIG. 9, a dry double clutch transmission system is illustrated, showing multiple sensors 920 that can be controlled by an ECU via an interface according to various aspects described herein. In the example transmission unit shown in FIG. 9, two BLDC (brushless direct current) motors are used to perform the control of the double clutch; another two BLDC motors are used to position the gear levers. Therefore, a total of four rotor position sensors are required for the application. In accordance with embodiments employing the high speed sensor interface described herein, four separate sensor cables can be wired to the ECU, and all four sensors can be connected to one single interface. Additionally, other sensors such as oil pressure sensors or gear lever position feedback sensors can be connected to the bus leading to an even more significant reduction of wiring complexity.

Figure 10:
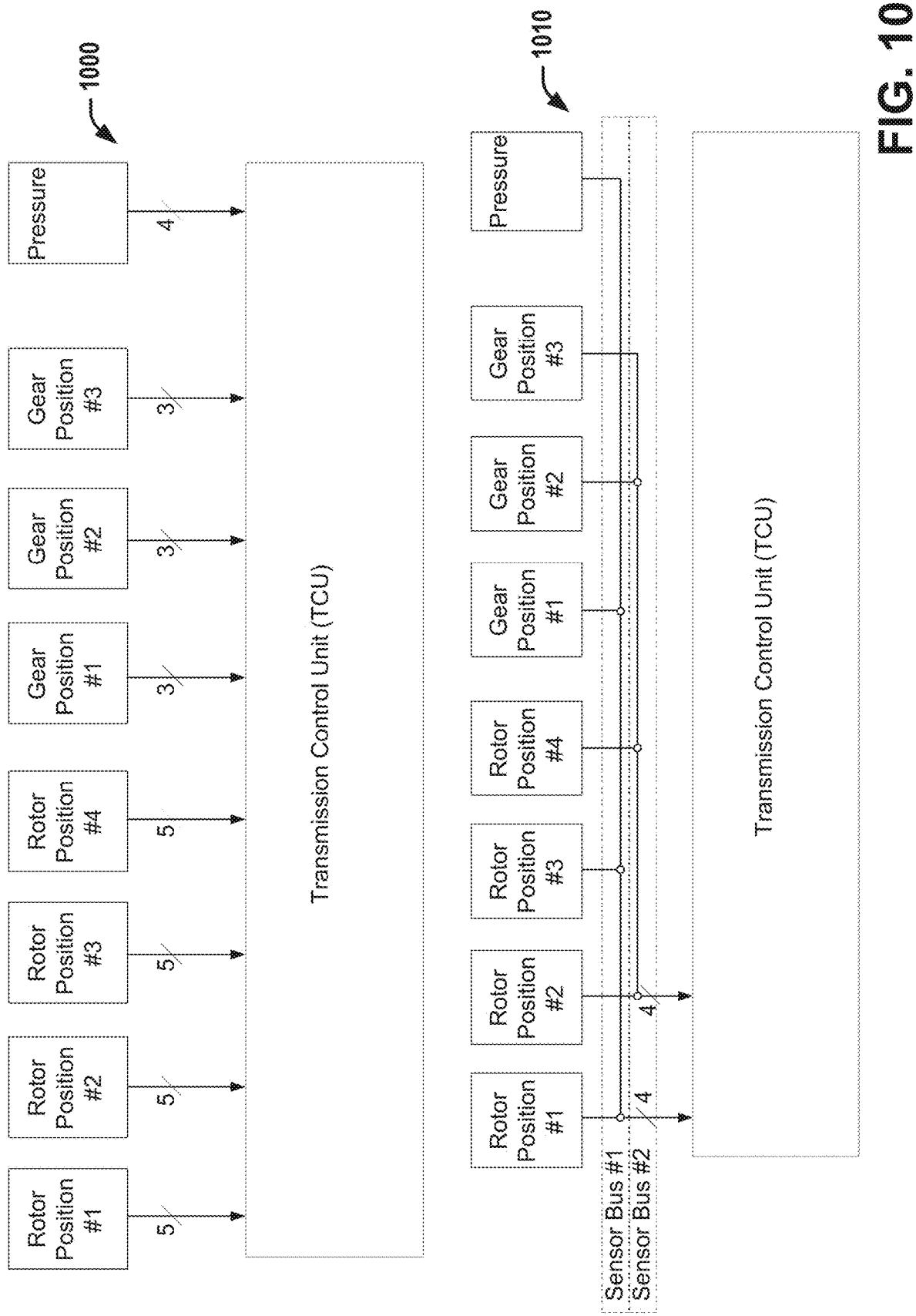
FIG. 10 is a diagram illustrating an example point-to-point wiring scheme applied in conventional interfaces contrasted with a wiring scheme based on a sensor bus interface according to various aspects described herein.

Referring to FIG. 10, illustrated is an example point-to-point wiring scheme 1000 applied in conventional interfaces contrasted with a wiring scheme 1010 based on a sensor bus interface employed in connection with various aspects described herein. The conventional point-to-point current wiring scheme 1000 comprises a total of 33 connections to the transmission control unit. In contrast, the sensor bus wiring scheme employed in embodiments disclosed herein can reduce the number of connections to four. However, to for increased safety, the sensors can be split into two groups resulting in a total of eight connections, as shown in the wiring scheme 1010.

In a third set of examples, embodiments described herein can be employed in connection with systems reliant on simultaneous data from more than one sensor.

Figure 11:
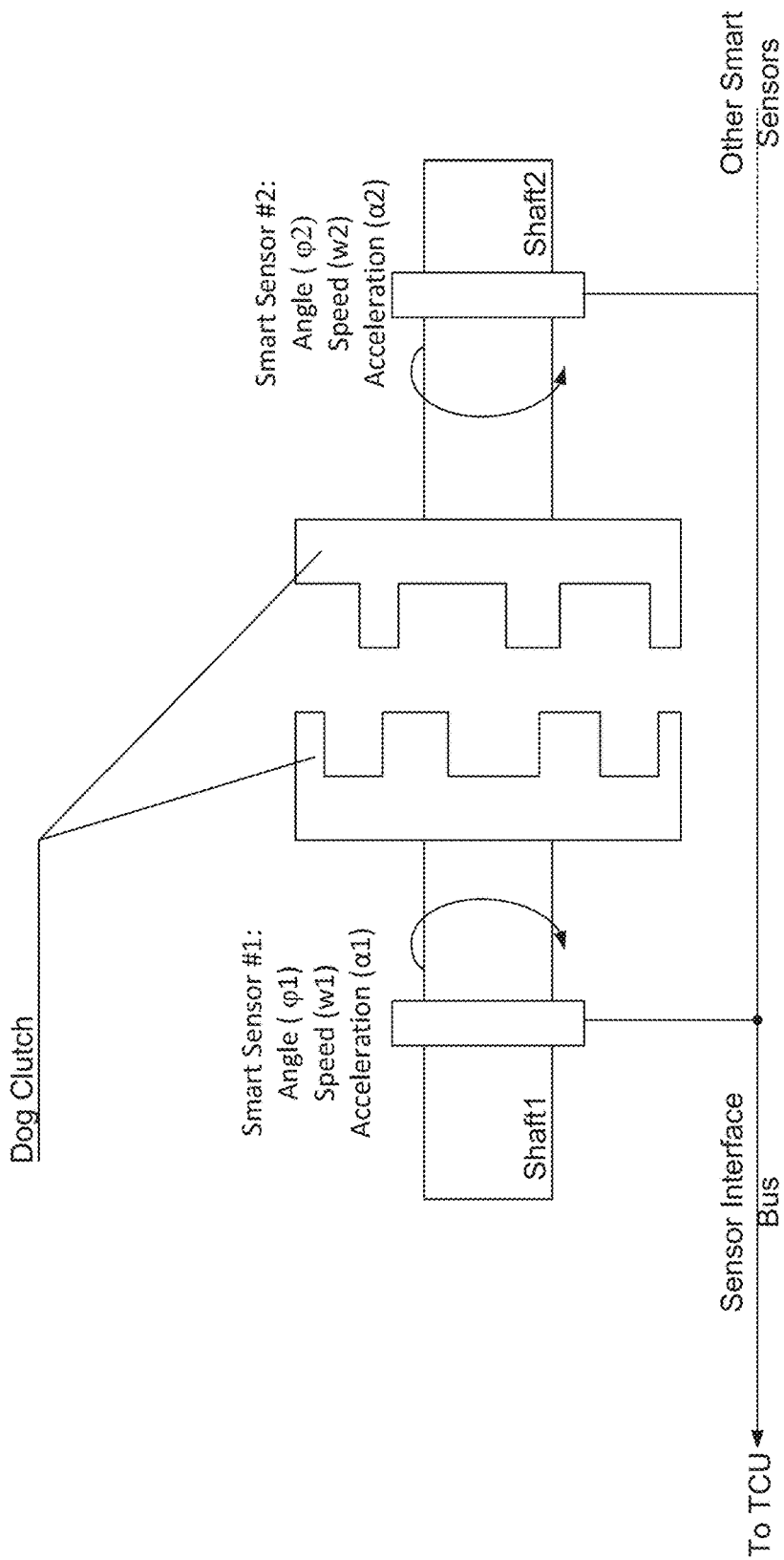
FIG. 11 is a diagram illustrating illustrated is an example dog clutch and associated sensor system according to various aspects described herein.

Traditional clutch systems (e.g., dry clutch, wet clutch) are controlled by applying a pressure to the friction plates. The only feedback parameter required for the control loop is the residual slip of the clutch, and this information can be easily taken by a basic speed measurement of both the input and output shaft. However, due to the increased efficiency, dog clutches are introduced in more advanced transmission systems. Referring to FIG. 11, illustrated is an example dog clutch and associated sensor system. As can be seen in FIG. 11, dog gears employed in dog clutches have more space than traditional gears, so that teeth butt up against each other, rather than meshing directly.

While conventional clutches can be closed at any phase relation between the plates, closing a dog clutch requires synchronization of both the speeds and absolute shaft angles of both shafts. Thus, a sensor cluster that provides the relevant information (angle, speed, acceleration) at high update rates is important. Embodiments employing the sensor interface discussed herein can provide significant benefits, in terms of: reduced wiring complexity; the ability to synchronize the sensor cluster to obtain higher sensing accuracy; and the ability to transfer additional information (e.g., diagnostic information that can be used to validate sensor data, leading to greater functional safety, etc.).

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations. In addition, while a particular feature may have been disclosed with respect to only one of several implementations, such feature may be combined with one or more other features of the other implementations as may be desired and advantageous for any given or particular application.

What is claimed is:

1. A system, comprising:
    a sensor bus;
    an electronic control unit (ECU) couplable to the sensor bus and configured to generate a synchronization signal, wherein the ECU is configured to output the synchronization signal to the sensor bus; and
    a plurality of sensors couplable to the sensor bus, wherein the plurality of sensors are configured to acquire respective sensor data and to output a respective digital representation of the respective sensor data in a respective frame to the sensor bus, wherein the respective sensor data represented by the respective digital representation has a predetermined latency relative to the synchronization signal,
wherein each sensor, of the plurality of sensors, is associated with a common address and a respective unique address,
wherein each sensor outputs the respective digital representation of the respective sensor data in the respective frame based on a predetermined order and without receiving a signal that includes an address element corresponding to the respective unique address associated with each sensor, and
wherein the predetermined order is based on an order of the respective unique address associated with each sensor.

2. The system of claim 1,
wherein each sensor, of the plurality of sensors, is configured to acquire the respective sensor data and to output the respective digital representation of the respective sensor data in the respective frame to the sensor bus.

3. The system of claim 2, wherein the plurality of sensors are configured to sequentially output the respective digital representations to the sensor bus.

4. The system of claim 2, wherein the synchronization signal initiates output of each respective digital representation from the plurality of sensors.

5. The system of claim 2, wherein each respective digital representation has a pre-defined latency relative to the synchronization signal.

6. The system of claim 1, wherein the synchronization signal comprises an address element that indicates the common address associated with the plurality of sensors.

7. The system of claim 6, wherein the address element comprises a quantity of bits, and wherein at least one of a maximum quantity of sensors included in the plurality of sensors or a maximum quantity of sensor combinations that can be uniquely identified is based on the quantity of bits.

8. A sensor, comprising:
one or more components to:
acquire sensor data;
receive a synchronization signal; and
output a digital representation of the sensor data in a respective frame,
wherein the sensor data represented by the digital representation has a predetermined latency relative to the synchronization signal,
wherein the sensor is included in a plurality of sensors and each sensor, of the plurality of sensors, is associated with a common address and a respective unique address,
wherein the sensor outputs the digital representation in the respective frame based on a predetermined order and without receiving a signal that includes an address element corresponding to the respective unique address associated with each sensor, and
wherein the predetermined order is based on an order of the respective unique address associated with each sensor.

9. The sensor of claim 8, wherein the synchronization signal initiates output of the digital representation.

10. The sensor of claim 8, wherein the digital representation is output in sequence with digital representations of sensor data from other sensors.

11. An electronic control unit (ECU), comprising:
one or more components to:
generate a synchronization signal;
output the synchronization signal to a plurality of sensors via a sensor bus, wherein the plurality of sensors are configured to acquire respective sensor data and to output a respective digital representation of the respective sensor data in a respective frame to the sensor bus; and
receive the respective digital representation of the respective sensor data in a respective frame from the plurality of sensors via the sensor bus,
wherein the respective sensor data represented by the respective digital representation has a predetermined latency relative to the synchronization signal,
wherein each sensor, of the plurality of sensors, is associated with a common address and a respective unique address,
wherein each sensor outputs the respective digital representation of the respective sensor data in the respective frame based on a predetermined order and without receiving a signal that includes an address element corresponding to the respective unique address associated with each sensor, and
wherein the predetermined order is based on an order of the respective unique address associated with each sensor.

12. The ECU of claim 11, wherein the respective digital representations are received sequentially from the plurality of sensors.

13. The ECU of claim 11, wherein the synchronization signal initiates output of each respective digital representation from the plurality of sensors.

14. The ECU of claim 11, wherein each respective digital representation has a pre-defined latency relative to the synchronization signal.

15. The ECU of claim 11, wherein the synchronization signal comprises an address element that indicates the common address associated with the plurality of sensors.

16. The ECU of claim 15, wherein the address element comprises a quantity of bits, and wherein at least one of a maximum quantity of sensors included in the plurality of sensors or a maximum quantity of sensor combinations that can be uniquely identified is based on the quantity of bits.

* * * * *